(12) United States Patent
Pionke et al.

(10) Patent No.: US 8,075,002 B1
(45) Date of Patent: Dec. 13, 2011

(54) SEMI-ACTIVE SUSPENSION SYSTEM

(75) Inventors: Ralf Pionke, Farmington Hills, MI (US); John George Bocik, Canton, MI (US)

(73) Assignee: AM General LLC, South Bend, IN (US)

( * ) Notice: Subject to any disclaimer, the term of this patent is extended or adjusted under 35 U.S.C. 154(b) by 155 days.

(21) Appl. No.: 12/313,306

(22) Filed: Nov. 18, 2008

(51) Int. Cl.
*B60G 17/00* (2006.01)
*B60G 17/08* (2006.01)

(52) U.S. Cl. ...... 280/5.5; 701/37; 280/5.507; 280/5.514

(58) Field of Classification Search ............ 280/5.5, 280/5.501, 5.506, 5.508, 5.509, 5.51, 5.514, 280/5.515, 124.157, 124.16, 124.161, 5.507; 701/37, 38, 41; 188/316, 317, 319.1, 322.15, 188/304; 267/64.15, 64.25, 64.26

See application file for complete search history.

(56) References Cited

U.S. PATENT DOCUMENTS

| | | | | |
|---|---|---|---|---|
| 2,909,368 A * | 10/1959 | Taylor | | 267/64.13 |
| 3,186,702 A * | 6/1965 | Taylor | | 267/129 |
| 3,342,474 A * | 9/1967 | Bittel | | 267/129 |
| 3,722,640 A * | 3/1973 | Taylor | | 188/316 |
| 3,747,913 A * | 7/1973 | Savery | | 267/64.28 |
| 4,079,923 A * | 3/1978 | Kirchner | | 267/64.13 |
| 4,591,033 A * | 5/1986 | Taylor | | 188/317 |
| 5,097,419 A * | 3/1992 | Lizell | | 701/37 |
| 5,152,547 A * | 10/1992 | Davis | | 280/5.512 |
| 5,305,859 A * | 4/1994 | Davis | | 188/282.1 |
| 5,316,272 A * | 5/1994 | Davis | | 267/64.13 |
| 5,601,307 A * | 2/1997 | Heyring et al. | | 280/6.157 |
| 6,181,997 B1 * | 1/2001 | Badenoch et al. | | 701/37 |
| 6,202,011 B1 * | 3/2001 | Jeon | | 701/37 |
| 6,264,212 B1 * | 7/2001 | Timoney | | 280/5.51 |
| 6,293,530 B1 * | 9/2001 | Delorenzis et al. | | 267/64.13 |
| 6,305,673 B1 * | 10/2001 | Delorenzis et al. | | 267/64.13 |
| 6,370,458 B1 * | 4/2002 | Shal et al. | | 701/37 |
| 6,389,341 B1 * | 5/2002 | Davis | | 701/37 |
| 6,397,134 B1 * | 5/2002 | Shal et al. | | 701/37 |
| 6,598,885 B2 * | 7/2003 | Delorenzis et al. | | 280/5.507 |
| 6,679,504 B2 * | 1/2004 | Delorenzis et al. | | 280/5.507 |
| 6,811,167 B2 * | 11/2004 | Coombs et al. | | 280/124.154 |
| 6,871,866 B2 * | 3/2005 | Gloceri et al. | | 280/124.154 |
| 6,886,841 B2 * | 5/2005 | Coombs et al. | | 280/124.157 |
| 6,935,639 B1 * | 8/2005 | Song et al. | | 280/5.514 |
| 6,988,599 B2 * | 1/2006 | Coombs et al. | | 188/280 |
| 7,413,063 B1 * | 8/2008 | Davis | | 188/267.1 |
| 7,641,181 B2 * | 1/2010 | Delorenzis | | 267/64.13 |
| 7,770,701 B1 * | 8/2010 | Davis | | 188/267.1 |
| 7,770,902 B1 * | 8/2010 | Davis | | 280/5.5 |
| 2003/0075881 A1 * | 4/2003 | Delorenzis et al. | | 280/5.5 |
| 2003/0075882 A1 * | 4/2003 | Delorenzis et al. | | 280/5.508 |
| 2003/0102646 A1 * | 6/2003 | Gloceri et al. | | 280/124.161 |
| 2005/0073125 A1 * | 4/2005 | Coombs et al. | | 280/124.16 |

\* cited by examiner

*Primary Examiner* — Paul N Dickson
*Assistant Examiner* — Joseph Rocca
(74) *Attorney, Agent, or Firm* — Barnes & Thornburg LLP

(57) ABSTRACT

A suspension system for a wheeled vehicle includes hydraulic actuators associated with each of the vehicle's wheels, a hydraulic pump, a hydraulic accumulator, a compressible hydraulic fluid, and a hydraulic manifold including control valves that open and close to control the hydraulic fluid flow and pressure to each of the hydraulic actuators. The control valves are regulated by a control system including a processor running an algorithm that receives data from switches and sensors providing information regarding the vehicle's state and mode of intended use or storage.

20 Claims, 4 Drawing Sheets

SEMI-ACTIVE SUSPENSION SYSTEM

BACKGROUND OF THE INVENTION

Most wheeled motor vehicles include some form of passive suspension system including leaf or coil springs to absorb shocks caused by road irregularities, such as bumps and pot holes, and dampers to attenuate the resultant spring oscillations. Although many modern passive suspension systems can afford an acceptable compromise between comfort and performance, tuning a suspension for comfort typically results in decreased performance and vice versa. Further, passive suspension systems typically are not able to anticipate cornering or braking loads and can only react to such loads after they are imparted to the vehicle.

Semi-active suspensions have been developed which achieve a better compromise of comfort and performance by affording variable damper calibration. Other semi-active or active systems use gas-over-oil hydraulic struts. Such systems typically use conventional hydraulic fluid, which generally is considered to be incompressible, in conjunction with a pressurized gas to effect spring function. In such systems, the pressurized gas, and not the fluid, acts as a spring

SUMMARY OF THE INVENTION

The present invention is directed to a semi-active suspension system for a vehicle, preferably, a wheeled vehicle. A preferred embodiment of the present invention includes hydraulic struts associated with each of the vehicle's wheels, a hydraulic pump, a hydraulic accumulator, a compressible hydraulic fluid, and a hydraulic manifold and associated control valves for controlling the flow of hydraulic fluid to and from, and hydraulic pressure in, each of the hydraulic struts. A preferred embodiment of a system according to the present invention also includes a controller for regulating the control valves. The controller preferably includes sensors for obtaining data indicative of the vehicle's state, for example, its speed and steering wheel position, switches for providing data indicative of the vehicle's intended use, for example, on-road or off-road use, and a processor that receives data from the sensors and switches, processes the data according to one or more predetermined algorithms, and provides signals causing the pump to turn on and off and the control valves to open and close to adjust the hydraulic fluid pressure in the struts.

DETAILED DESCRIPTION OF THE DRAWINGS

Figure 1:
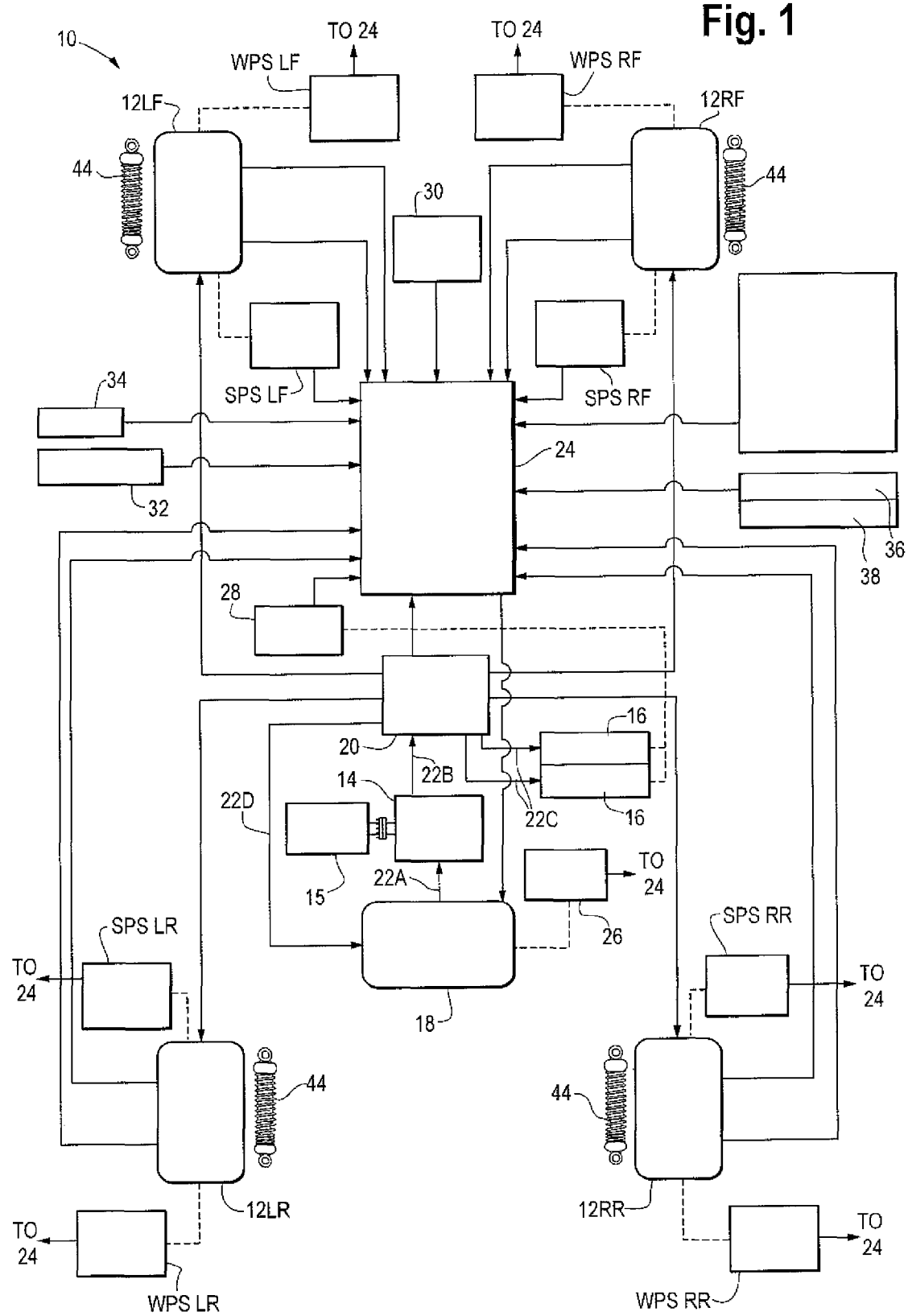
FIG. 1 is a schematic diagram of a semi-active suspension system according to the present invention.

FIG. 1 illustrates schematically a semi-active suspension system 10 for a wheeled vehicle (not shown) according to a preferred embodiment of the present invention. System 10 includes a hydraulic strut $12xy$ associated with each of the vehicle's wheels, hydraulic pump 14, hydraulic accumulators 16, hydraulic fluid reservoir 18, hydraulic manifold 20 and associated control valves for selectively, hydraulically aligning struts 12, pump 14, electric pump motor 15, accumulators 16, reservoir 18, hydraulic lines 22 interconnecting the foregoing components, and a compressible hydraulic working fluid (not shown). System 10 also includes controller 24. Controller 24 preferably is coupled to sensors and user selectable controls and includes a processor that generates control signals based on sensor and/or switch data and one or more algorithms, and provides control signals to pump motor 15 and the control valves associated with manifold 20.

System 10 preferably is rated for static hydraulic pressures of 0-10,000 psi or more. The dynamic pressures in use could be substantially greater. The hydraulic fluid used in system 10 preferably is a silicone-based hydraulic fluid compressible through at least a portion of this pressure range. One preferred working hydraulic fluid is Dow Corning 510® Fluid, 50 centistoke, which has a compressibility of about 2-4% at about 5000 psi and about 5-8% at about 10,000 psi. Other compressible hydraulic fluids could be used, as well.

Figure 2:
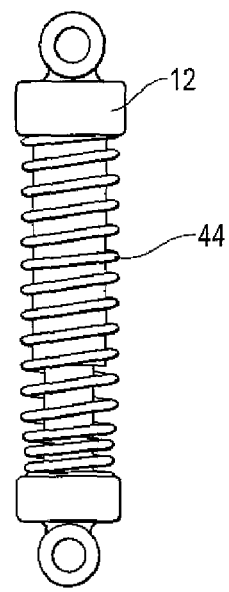
FIG. 2 is a perspective view of an actuator and spring installed on a vehicle according to a preferred embodiment of the present invention.

Each of hydraulic struts 12 can be any suitable hydraulic actuator operable at the struts' working pressure, preferably 0-8000 psi or more, and compatible with the working fluid. One suitable front strut is Part No. G-11861 supplied by General Kinetics, and one suitable rear strut is Part. No. G-11793 supplied by General Kinetics. Hydraulic struts 12 can be connected to the vehicle's suspension system in any suitable manner, as would be recognized by one skilled in the art. A conventional spring, for example, spring 44, can but need not be associated with each strut 12. Where provided, spring 44 preferably also is connected to the vehicle's suspension system in any suitable manner, as would be recognized by one skilled in the art. Preferably, conventional spring 44, where provided, takes the form of a coil spring disposed over hydraulic strut 12 in a coil-over arrangement, as illustrated in FIG. 2. Other spring types and attachment methods could be used as well. Where provided, conventional spring 44 can at least partially support the weight of the vehicle on its suspension and can provide at least limited suspension function in the event of catastrophic failure of the hydraulic system.

Hydraulic accumulator 16 can be any suitable hydraulic accumulator operable at the accumulator's working pressure, preferably up to 9000 psi or more, and compatible with the working fluid. One suitable accumulator is Part No. 03441316 supplied by Hydac/Morrell. Hydraulic accumulator 16 preferably is hydraulically coupled to manifold 20 by high pressure hydraulic line 22C. In other embodiments, accumulator 16 could be hydraulically coupled to manifold 20 in any other suitable manner, for example, by direct coupling. FIG. 1 illustrates system 10 including two accumulators 16. Alternate embodiments could include more or fewer accumulators 16.

Hydraulic pump 14 can be any suitable hydraulic pump compatible with the working fluid and capable of generating sufficient system working pressure. Preferably, hydraulic pump 14 is capable of generating working pressures up to 9000 psi or more. One suitable hydraulic pump is Part No. 02595444 supplied by Hydac/Morrell. Pump 14 preferably is hydraulically coupled to reservoir 18 by low pressure hydraulic line 22A and to manifold 20 by high pressure hydraulic line 22B. In other embodiments, pump 14 could be hydraulically coupled to manifold 20 in any other suitable manner, for example, by direct coupling.

Hydraulic reservoir 18 can be any suitable reservoir compatible with the working fluid. Hydraulic reservoir 18 is hydraulically coupled to pump 14 and manifold 20 by low pressure hydraulic lines 22A and 22D, respectively. In other embodiments, reservoir 18 could be hydraulically coupled to pump 14 and/or manifold 20 in any other suitable manner, for example, by direct coupling.

Hydraulic lines 20 can be any suitable hard or soft hydraulic line compatible with the working fluid and capable of withstanding the system's working hydraulic pressure. One suitable high pressure line is Part No. 1001-00300HH by CEJN/Hydra-Flex.

Manifold 20 can be any suitable hydraulic manifold operable at the system's working pressures and compatible with the working fluid. One suitable manifold is Part No. 02583571 supplied by Hydac/Morrell. Manifold 20 preferably is hydraulically coupled to hydraulic pump 14 by high pressure hydraulic line 22B and to reservoir 18 by low pressure hydraulic line 22D.

Figure 3:
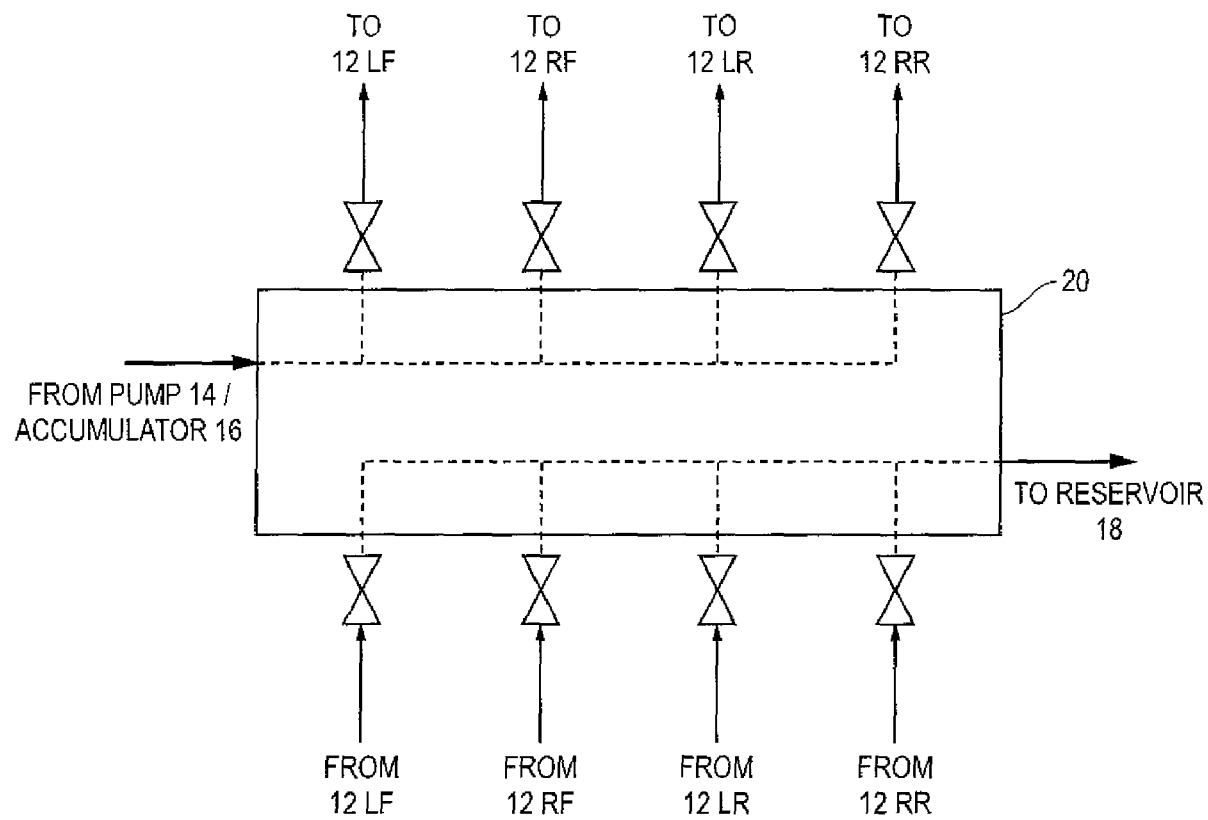
FIG. 3 is a schematic diagram of the layout of control valves associated with a hydraulic manifold according to a preferred embodiment of the present invention.

As illustrated in FIG. 3, manifold 20 is associated with charge valves CVLF, CVRF, CVLR, CVRR, which preferably are integrated with manifold 20, for example, by high pressure threaded connection or welding. Charge valves CVxy are hydraulically coupled, respectively, to corresponding struts 12LF, 12RF, 12LR, 12RR. Each of charge valves CVxy preferably is normally closed and can be opened on demand in response to a corresponding control signal from controller 24, thereby selectively, hydraulically aligning the corresponding strut with accumulator 16 such that the strut can be charged with hydraulic fluid stored in accumulator 16 (and/or pressurized by pump 14).

Manifold 20 also is associated with discharge valves DVLF, DVRF, DVLR, DVRR, which preferably are integrated with manifold 20, for example, by high pressure threaded connection or welding. Discharge valves DVxy are hydraulically coupled, respectively, to corresponding struts 12LF, 12RF, 12LR, 12RR. Each of discharge valves DVxy preferably is normally closed and can be opened on demand in response to a corresponding control signal from controller 24, thereby selectively, hydraulically aligning the corresponding strut with manifold 20 and ultimately (through manifold 20) to reservoir 18, thereby relieving hydraulic fluid and pressure from the strut. Because each of charge valves CVxy is normally closed and each of discharge valves DVxy is normally closed, each of struts 12xy is normally isolated from the rest of system 10 (except hydraulic lines 22 connecting struts 12xy to charge valves CVxy and discharge valves DVxy). As such, and because struts 12xy are charged with compressible fluid, struts 12xy function as springs.

Manifold 20 further includes pressure relief valve PRV which can be opened to discharge hydraulic fluid from manifold 20 to reservoir 18 via low pressure fluid return line 22D. Manifold 20 also preferably is configured to selectively isolate pump 14 from accumulator 16 through an internal valving arrangement when pump 14 is not running.

Each of charge valves CVxy, discharge valves DVxy, and electric motor 15 driving pump 14 preferably is controlled by controller 24. As indicated above, controller 24 includes a processor that receives data from one or more sensors and/or switches and uses this data in one or more algorithms that determine when to run pump 14 and when to open and close the foregoing control valves.

The sensors providing input to controller 24 preferably include strut pressure sensors SPSxy, wheel position sensors WPSxy, reservoir fluid level sensor 26, accumulator pressure sensor 28, steering wheel position sensor 30, three-axis accelerometer 32, and roll rate gyroscope 33. Controller 24 also preferably receives data from sensors measuring vehicle speed, engine speed, ambient air temperature, parking brake pedal position, service brake pedal position, vehicle battery potential, transmission selector position, and transfer case selector position. Preferably, data from the latter group of sensors is provided over the vehicle's CAN bus, which carries data regarding these vehicle parameters and may carry other data, as well. In the event the vehicle is not equipped with a CAN bus or similar means for data communication, the foregoing information could be provided directly to controller 24 from sensors or switches adapted to obtain the information. The switches providing input to controller 24 preferably include ignition switch 34, multi-position transport mode switch 36, and multi-position terrain mode switch 38. Alternate embodiments could use more or fewer switches and/or sensors providing information indicative of more, fewer, or different parameters.

Strut pressure sensors SPSxy can be any suitable sensor capable of sensing the struts' working pressures. Strut pressure sensors SPSxy preferably are located in or near manifold 20 and are in constant hydraulic communication with corresponding struts 12 and in electrical communication with controller 24. Alternatively, strut pressure sensors SPSxy could be located remotely at or near the corresponding struts. The manifold location is preferred because it eliminates the expense, complication, and weight of, as well as the likelihood of incurring damage to, the additional wiring that would be required to connect strut pressure sensors SPSxy to controller 24 were sensors SPSxy to be located remotely.

Figure 4:
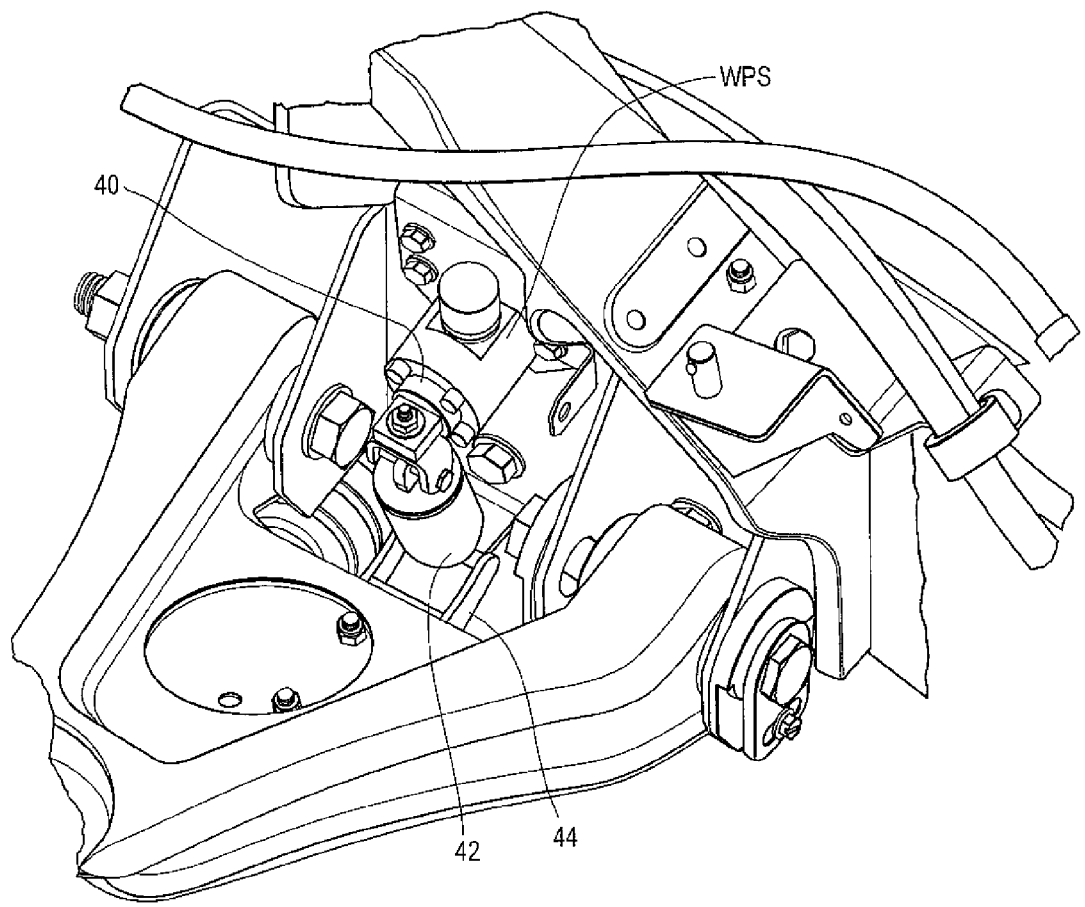
FIG. 4 is a perspective view of a front wheel position sensor installed on a vehicle according to a preferred embodiment of the present invention.
Figure 5:
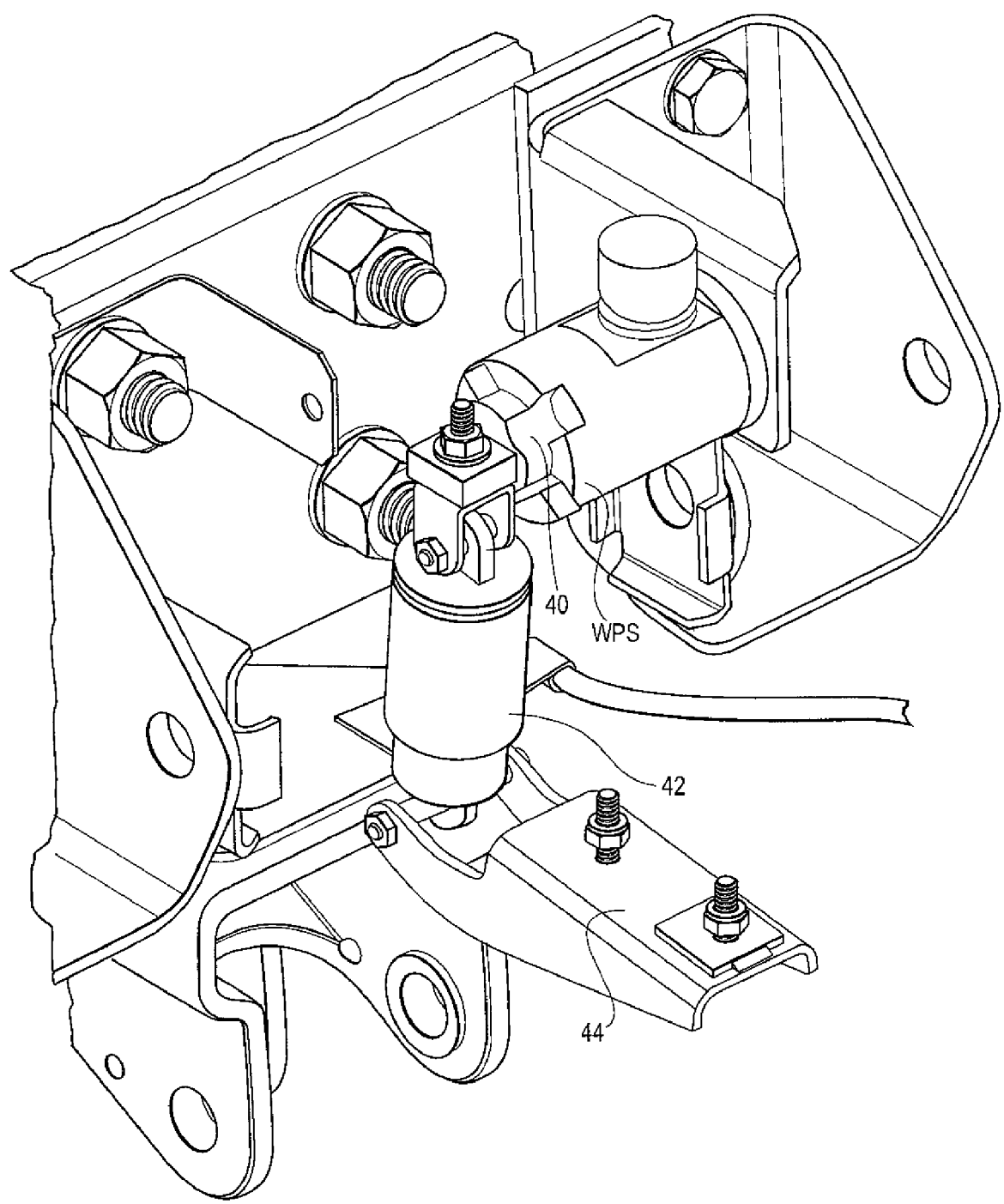
FIG. 5 is a perspective view of a rear wheel position sensor installed on a vehicle according to a preferred embodiment of the present invention

Wheel position sensors WPSxy preferably are motionless sensors embodied as strain gauges mounted in association with the vehicle's control arms or other suspension links. FIG. 4 illustrates such a front wheel position sensor installed on the vehicle and FIG. 5 illustrates such a rear wheel position sensor installed on the vehicle. Wheel position sensors WPSxy preferably include a strain gauge in nose piece 40. Resilient member 42 preferably is coupled between nose piece 40 and link 42. Link 42 preferably is connected to a corresponding control arm, swing arm, or other suspension component that moves in relation with a corresponding wheel or other unsprung member. Resilient member 42 can be a spring (resilient member 42 is represented as a shrouded spring in FIGS. 4 and 5), an elastomer, or any other suitable resilient member that can flex/deflect and rebound with motion of the foregoing suspension component, as would be understood by one skilled in the art. Alternatively, wheel position sensors WPSxy could be embodied as a conventional position sensor, for example, Part. No. SRH501 supplied by Penny & Giles.

Reservoir level sensor 28 can be any suitable level sensor, for example a float switch, a capacitive sensor, or other form of sensor, adapted to sense fluid level in reservoir 28.

Accumulator pressure sensor 30 can be any suitable form of pressure sensor capable of sensing the accumulator's working pressures.

Steering wheel position sensor 32 can be any suitable sensor capable of sensing steering wheel position or angle.

Ignition switch 34 preferably provides a signal indicative of whether the vehicle's ignition is switched on or off.

Transport mode switch 36 preferably provides a signal indicative of whether the vehicle's suspension is to be configured for normal operation or for transport according to one or more transport modes. In a preferred embodiment, transport mode switch 36 allows a normal operating mode position and two transport mode positions, as will be discussed further below.

Terrain switch 38 preferably provides a signal indicative of whether the suspension is to be configured for on-road use or on one or more types of off-road terrain. In a preferred embodiment, terrain switch 38 includes an on-road operating mode position, an off road operating mode position, and a mud/sand/snow operating mode position, as will be discussed further below.

As mentioned above, controller 24 controls the operation of charge valves CVxy, discharge valves DVxy, and motor 15 driving pump 14, to support one or more system operating modes, as discussed further below. In normal operation, controller 24 preferably selectively operates motor 15 driving pump 14 to maintain the hydraulic pressure in accumulator 16 between about 8000 and 9000 psi, based on signals received from accumulator pressure sensor 30. More particularly, controller 24 preferably provides an on signal to pump motor 15 when accumulator pressure drops below about 8000 psi and provides an off signal to pump motor 15 when accumulator pressure reaches about 9000 psi.

Based on sensor and/or switch data and one or more algorithms, controller 24 also determines a desired strut pressure at each of struts 12xy at a given time. If the pressure at any strut (measured using the corresponding strut pressure sensor) at that time is lower than the desired pressure, controller 24 provides a signal to the corresponding charge valve CVxy to open, thereby further pressurizing the strut with hydraulic fluid stored in accumulator 16. Charge valves CVxy otherwise are closed, thereby isolating struts 12xy from accumulator 16. If the pressure at any strut (measured using the corresponding strut pressure sensor) is higher than the desired pressure, controller 24 provides a signal to the corresponding discharge valve DVxy to open, thereby bleeding strut pressure to manifold 20 and ultimately to fluid reservoir 18.

Controller 24 determines the desired strut pressure at a given time according to switch and/or sensor data and one or more algorithms that preferably determine appropriate strut pressures based on one or more operating modes. Where system 10 supports multiple operating modes, system 10 allows for prioritization of the operating mode in effect at any given time. Preferably, system 10 supports the following operating modes from lowest priority to highest priority: leveling, cornering and braking, terrain, platform, rock crawling, transport, fault, manual, and power down. Entry into higher priority operating modes generally overrides lower priority operating modes, although system 10 can in some instances support more than one operating mode simultaneously, as discussed further below.

In leveling mode, system 10 acts to substantially maintain a predetermined average ride height by raising and lowering the four corners of the vehicle individually as they encounter variations in terrain, for example, bumps and potholes. More particularly, controller 24 receives from applicable sensors and/or switches information relevant to maintaining a predetermined average ride height, processes the data in connection with a predetermined algorithm, and provides control signals to charge valves CVxy and discharge valves DVxy as needed to effect average ride height maintenance. Such relevant sensor and switch data can include, but is not limited to, vehicle speed, wheel position, strut pressure, roll rate, three-axis acceleration, and desired ride height (as might be selected using terrain switch 38).

System 10 preferably enters leveling mode as the default mode when the engine is running and the vehicle's speed exceeds a predetermined threshold, for example, 2 mph. When system 10 is in leveling mode, charge and discharge valves CVxy, DVxy preferably are disabled when certain parameters meet certain predetermined thresholds, for example, when vehicle speed is less than 2 mph, battery potential is less than 10 V, engine speed is less than 600 rpm, accumulator pressure is less than a threshold pressure, or strut pressure is less than a threshold pressure, for example, 250 psi. When system 10 is in leveling mode, pump motor 15 preferably is disabled when certain parameters meet certain predetermined thresholds, for example, battery potential is less than 10 V, engine speed is less than 600 rpm, accumulator pressure is greater than 9000 psi, ambient temperature is less than −70 degrees F., reservoir fluid level is below a predetermined level, accumulator pressure sensor 28 indicates a fault, or the pump charge rate indicates a fault. Accumulator pressure below the normal accumulator operating pressure range and/or a pump charge rate greater than anticipated could, for example, indicate failure of accumulator 16, pump 14, pump motor 15, or any portion of the hydraulic system coupling accumulator 16 and pump 14. Pump charge rate herein refers to the rate at which pump 14 is expected to charge system 10, and particularly accumulator 16, with hydraulic pressure, as would be understood by one skilled in the art.

One skilled in the art would recognize that vehicle weight is shifted toward the outside of a turn when the vehicle is cornering and that vehicle weight is shifted forward when the vehicle is braking. In cornering mode and braking mode, system 10 preferably anticipates and/or responds to vehicle body motion that would result from cornering and braking loads and pre-emptively and/or responsively pressurizes and/or depressurizes individual struts to control anticipated and/or actual body pitch and roll. That is, when a vehicle equipped with system 10 is cornering, controller 24 acts to reduce pressure in the inside wheel struts and increase pressure in the outside wheel struts to reduce body roll, and when such a vehicle is braking, controller 24 acts to reduce pressure in the rear wheel struts and increase pressure in the front wheel struts to reduce body pitch.

More particularly, controller 24 receives from applicable sensors and/or switches information relevant to anticipated and/or actual vehicle body loads resulting from cornering and/or braking, processes the data in connection with a predetermined algorithm, and provides control signals to charge valves CVxy and discharge valves DVxy as needed to mitigate body roll and pitch resulting from such cornering and braking. Such relevant sensor data can include, but is not limited to, vehicle speed, wheel position, strut pressure, steering wheel position (from which rate of change of steering angle can be derived by controller 24), brake pedal position, roll rate, three-axis acceleration, and desired ride height (as might be selected using terrain switch 38). The foregoing parameters could be relevant to anticipating an amount of body roll or pitch that might result from initiating and/or maintaining a degree of cornering and/or braking force.

System 10 preferably enters cornering and braking mode when vehicle speed exceeds 17 mph, steering wheel angle as a function of vehicle speed is greater than a predetermined angle, and steering wheel angle is changing at greater than 180 degrees per second, or when the brake pedal is applied. System 10 preferably exits cornering and braking mode and reverts to leveling mode when the steering wheel angle as a function of vehicle speed is less than a predetermined angle for at least some predetermined time threshold (preferably at least 500 ms) or the vehicle speed is less than 15 mph for at least some predetermined time threshold, or the brake pedal is released. The time thresholds could be set at zero or greater, as desired.

When in cornering mode and braking mode, charge and discharge valves CVxy, DVxy preferably are disabled when certain parameters meet certain predetermined thresholds, example, when battery potential is less than 10 V, engine speed is less than 600 rpm, accumulator pressure is below a threshold pressure, or strut pressure is less than a threshold pressure, for example, 250 psi. When in cornering mode and braking mode, pump 14 preferably is disabled when certain parameters meet certain predetermined thresholds, for example, when battery potential is less than 10 V, engine speed is less than 600 rpm, accumulator pressure is greater than 9000 psi, ambient temperature is less than −70 degrees F., the reservoir fluid level is below a threshold, accumulator pressure sensor 28 indicates a fault, or the pump charge rate indicates a fault.

System 10 preferably supports two or more terrain modes, for example, on-road mode, off-road mode, and mud/sand/snow mode. Such terrain modes preferably are selectable by terrain switch 38, subject to the state of certain other vehicle operating parameters. The leveling, cornering and braking functionality discussed above preferably remains operable regardless of whether the system 10 is operating in on-road, off-road, or mud/sand/snow mode.

With terrain switch 38 in the on-road position or with the vehicle traveling at speeds greater than a threshold speed, for example, 35 mph, for longer than a threshold time, for example, ten seconds, controller 24 preferably acts to set the vehicle's average ride height at a first predetermined height. With terrain switch 38 in the off-road position and the vehicle traveling at speeds lower than a threshold speed, for example, 15 mph, controller 24 acts to set the vehicle's average ride height at a second predetermined height, preferably about an inch higher than the first predetermined height. Controller 24 preferably uses data received from wheel position sensors WPSxy to set both the on-road and off-road ride heights. Once system 10 has entered the off-road mode, controller 24 preferably acts to maintain the average ride height at the second predetermined height until terrain switch 38 is placed in the on-road position or the vehicle speed exceeds 35 mph for longer than a threshold time, for example ten seconds. Once either of these criteria has been met, controller 24 preferably acts to return the vehicle's ride height to the first predetermined ride height.

In a vehicle equipped with a central tire inflation system (CTIS), placing terrain switch 38 in the off-road position with the vehicle traveling at speeds lower than a threshold speed also preferably causes controller 24 or another controller (not shown) to operate the CTIS to lower or otherwise set the air pressure in the vehicle's tires to a predetermined pressure selected to provide better flotation and traction than might be available at tire pressures preferred for on-road use, as would be understood by one skilled in the art. Controller 24 or another controller preferably operates the CTIS to reset the tire pressures to predetermined pressures appropriate for on-road use upon exit from off-road mode, as discussed above.

With terrain switch 38 in the mud/sand/snow position and the vehicle traveling at less than a threshold speed, for example, 15 mph controller 24 preferably acts as set forth above in the discussion of the off-road mode, except that controller 24 preferably sets a different average ride height and/or controller 24 or another controller preferably sets different tire inflation setpoints. Alternatively, the average ride height setpoint could be the same in both the off-road and mud/sand/snow modes and CTIS actuation would occur only in mud/sand/snow modes. Other variations of this theme could be implemented, as well.

Alternatively, terrain mode selection could be effected by software rather than a hard-wired switch. Such software would be configured to determine road conditions based on sensor data, for example, wheel position sensor data, vehicle speed data, and/or strut pressure data, among others.

In a vehicle equipped with a traction control system, entry into the off-road and/or mud/snow/sand modes also preferably alters the traction control system calibration to allow a different amount of, and preferably more, wheelspin than would be allowed in the on-road mode, to allow for better control of the vehicle and/or extrication of the vehicle from deep mud, sand, or snow, as would be understood by one skilled in the art.

With system 10 in either the off-road mode or the mud/sand/snow mode, charge and discharge valves CVxy, DVxy preferably are disabled when certain parameters meet certain predetermined thresholds, for example, when battery potential is less than 10 V, engine speed is less than 600 rpm, strut pressure is below a threshold, or strut pressure is below a threshold, for example, 250 psi. With system 10 in either the off-road mode or the mud/sand/snow mode, pump 14 preferably is disabled when certain parameters meet certain predetermined thresholds, for example, battery potential is less than 10 V, engine speed is less than 600 rpm, accumulator pressure is greater than 9000 psi, ambient temperature is less than −70 degrees F., the reservoir fluid level is below a threshold, accumulator pressure sensor 28 indicates a fault, or the pump charge rate indicates a fault.

System 10 could be used on a vehicle having heavy, armored doors that could be extremely difficult or dangerous to open or close with the vehicle off-level. In platform mode, system 10 levels the vehicle to facilitate operation of such doors and ease ingress and egress. More particularly, controller 24 receives from applicable sensors and/or switches information relevant to placing and maintaining the vehicle in a level condition, processes the data in connection with a predetermined algorithm, and provides control signals to charge valves CVxy and discharge valves DVxy as needed to level the vehicle. Such relevant sensor and switch data can include, but is not limited to, vehicle speed, engine speed, transmission gear selector position, parking brake pedal position, wheel position, strut pressure, three-axis acceleration, and manual mode override switch position. System 10 preferably enters platform mode when the transmission gear selector is in PARK, engine speed is greater than, for example, 500 rpm, vehicle speed is less than a threshold speed, for example, 2 mph, the parking brake is on, and a manual override switch (not shown) is set to permit platform mode. System 10 preferably exits platform mode and reverts to one of the modes discussed above when transmission gear selector is not in PARK, engine speed is less than, for example, 500 rpm, vehicle speed is greater than a threshold speed, for example, 2 mph, the parking brake is off, or a manual override switch (not shown) is set to prohibit platform mode. System 10's valves and pump are always disabled in platform mode.

In rock crawling mode, system 10 disables charge valve CVxy and discharge valves DVxy so that system 10 does not act to change the ride height at any corner of the vehicle. More particularly, in rock crawling mode, controller 24 does not send any open signal to charge valve CVxy and discharge valves DVxy and the valves, therefore, remain in their normally closed states. System 10 preferably enters rock crawling mode with vehicle speed less than a predetermined threshold speed, for example, 10 mph and the transfer case range selector in four wheel drive low range. System 10 preferably exits rock crawling mode and reverts to one of the modes discussed above if vehicle speed exceeds 10 mph for more than twenty seconds or if the transfer case range selector is moved from four wheel drive low range. In rock crawling mode, pump 14 preferably is disabled when certain parameters meet certain predetermined thresholds, for example, when battery potential is less than 10 V, engine speed is less than 600 rpm, accumulator pressure is greater than 9000 psi, ambient temperature is less than −70 degrees F., the reservoir fluid level is below a threshold level, accumulator pressure sensor 38 indicates a fault, or the pump charge rate indicates a fault.

System 10 preferably supports one or more transport modes in which vehicle height is reduced. In such a transport mode, controller 24 acts to discharge hydraulic pressure from struts 12xy and accumulator 16 and to disable pump 14. System 10 preferably enters transport mode with transport switch 36 set to "transport," the ignition on, the engine running, and vehicle speed less than 2 mph. Once in transport mode, struts 12xy and accumulator 16 remain discharged when the engine is turned off. System 10 preferably exits transport mode and reverts to one of the modes discussed above with transport switch 36 set to off and the engine running, or when the vehicle is driven at speeds exceeding a threshold speed, for example, 15 mph for more than a threshold time, for example, twenty seconds. In transport mode, controller 24 also could operate the vehicle's CTIS to reduce the vehicle's tire pressures, thereby further reducing the vehicle's ride height. Conversely, controller 24 could operate the CTIS to restore the tire pressures upon exit from transport mode.

System 10 preferably enters fault mode in the event of a fault present on any of system 10's sensors. System 10 preferably must be power cycled to exit the fault mode. With system 10 in fault mode, controller 24 can act to disable charge valves CVxy, discharge valves DVxy, and/or pump 14 depending on the nature and/or severity of the fault.

System 10 can include a manual mode for testing the system and/or individual system components. Entry into and exit from the manual mode preferably is made by a software-based request delivered to controller 24 over the vehicle's CAN bus or otherwise through an appropriate communication port, as would be understood by one skilled in the art. With system 10 in the manual mode, charge and discharge valves CVxy and DVxy preferably are always operable to respond to instructions received from controller 24, which in turn may receive instructions from another processor or controller, as would be understood by one skilled in the art. With system 10 in manual mode, pump motor 15 preferably is disabled when certain parameters meet certain predetermined thresholds, for example, when accumulator pressure exceeds 9000 psi, ambient temperature is less than −70 degrees F., the reservoir fluid level is below a threshold level, or accumulator pressure sensor 38 indicates a fault.

In power down mode, charge and discharge valves CVxy and DVxy and pump motor 15 are disabled, thereby maintaining struts 12xy in the states they were in before system 10 entered power down mode. System 10 preferably enters power down mode when ignition switch 34 is set to off and system 10 preferably exits the power down mode when ignition switch 34 is set to on.

With system 10 operating in leveling mode or a terrain mode, controller 24 preferably also supports strut futility mode by acting to increase or decrease ride height setpoints in order to satisfy certain predetermined strut pressure thresholds. System 10 enters strut futility mode while in leveling mode or a terrain mode when the pressure in any strut 12xy exceeds 6500 psi in on-road terrain mode or 7000 psi in off-road terrain mode or any strut is within 500 psi of its pressure limit and the vehicle's speed is greater than 5 mph for at least 15 seconds. System 10 exits strut futility mode when the pressure in all of struts 12xy is less than 5750 psi in on-road terrain mode or 6250 psi in off-road terrain mode and all strut pressures are within 750 psi of their pressure limits or the vehicle's speed is less than 5 mph for more than 15 seconds or any valve CVxy, DVxy or pump motor 15 is disabled.

The parameters and setpoints discussed herein, for example, the parameters and setpoints used as criteria for mode entry and exit and valve and pump enabling and disabling, are for illustration only. One skilled in the art would recognize that such parameters and setpoints are tunable as desired.

The foregoing description and drawing figures disclose certain embodiments of the present invention, but do not limit its scope, which is defined solely by the appended claims. One skilled in the art would recognize that the embodiments disclosed herein could be modified without departing from the scope of the invention as claimed below.

The invention claimed is:

1. A suspension system for a vehicle, said suspension system comprising:
a hydraulic system including:
a plurality of hydraulic actuators;
a plurality of control valves associated with said hydraulic actuators;
a hydraulic pump;
a hydraulic accumulator;
a reservoir; and
a compressible hydraulic fluid in hydraulic communication with said plurality of hydraulic actuators, said plurality of control valves, said hydraulic pump, and said reservoir; and
a controller adapted to process data received from one or more switches or sensors and provide control signals to said control valves according to an algorithm embodied in said controller;
wherein said hydraulic actuators, said hydraulic pump, and said hydraulic accumulator operate at static hydraulic pressures of at least about 5750 psi;
wherein said reservoir operates at a pressure lower than the operating pressure of said hydraulic actuators, said hydraulic pump, and said hydraulic accumulator;
wherein said hydraulic actuators are selectively charged with hydraulic fluid drawn from said reservoir; and
wherein said actuators selectively discharge said hydraulic fluid to said reservoir.

2. The suspension system of claim 1 wherein said one or more switches or sensors comprises one or more of:
an actuator position sensor operably associated with a corresponding one of said plurality of hydraulic actuators;
a wheel position sensor operably associated with a corresponding one of said plurality of hydraulic actuators;
an accumulator pressure sensor associated with said hydraulic accumulator;
a steering position sensor;
a three-axis accelerometer; and
a selector switch.

3. The suspension system of claim 1 wherein said hydraulic system operates at static hydraulic pressures of at least about 6250 psi.

4. The suspension system of claim 1 wherein said hydraulic system operates at static hydraulic pressures of at least about 6500 psi.

5. The suspension system of claim 1 wherein said hydraulic system operates at static hydraulic pressures of at least about 7000 psi.

6. The suspension system of claim 1 wherein said hydraulic system operates at static hydraulic pressures of at least about 8000 psi.

7. The suspension system of claim 1 wherein said hydraulic system operates at static hydraulic pressures of at least about 10,000 psi.

8. The suspension system of claim 1 wherein said hydraulic actuators operate at static hydraulic pressures of at least about 5750 psi.

9. The suspension system of claim 1 wherein said hydraulic actuators operate at static hydraulic pressures of at least about 6250 psi.

10. The suspension system of claim 1 wherein said hydraulic actuators operate at static hydraulic pressures of at least about 6500 psi.

11. The suspension system of claim 1 wherein said hydraulic actuators operate at static hydraulic pressures of at least about 7000 psi.

12. The suspension system of claim 1 wherein said hydraulic actuators operate at static hydraulic pressures of at least about 8000 psi.

13. The suspension system of claim 1 wherein said hydraulic accumulator operates at static hydraulic pressures of at least about 8000 psi.

14. The suspension system of claim 1 wherein said hydraulic accumulator operates at static hydraulic pressures of at least about 9000 psi.

15. The suspension system of claim 1 wherein said hydraulic pump operates at static hydraulic pressures of at least about 9000 psi.

16. The suspension system of claim 1 wherein said controller determines a desired hydraulic pressure at a given time for each of said hydraulic actuators based on said data and said algorithm and wherein said control signals cause said control valves to open and/or close to adjust the pressure in each of said hydraulic actuators toward the respective desired pressure.

17. The suspension system of claim 16 wherein said desired pressures are selected to enable said suspension system to substantially maintain a predetermined average ride height.

18. The suspension system of claim 16 wherein said desired pressures are selected to enable said suspension system to mitigate pitch of said vehicle when said vehicle is braking.

19. The suspension system of claim 16 wherein said desired pressures are selected to enable said suspension system to mitigate roll of said vehicle when said vehicle is turning.

20. The suspension system of claim 16 wherein said desired pressures are selected to enable said suspension system to level the body of said vehicle with respect to gravity.

* * * * *